United States Patent
Obara

[11] Patent Number: 6,012,226
[45] Date of Patent: Jan. 11, 2000

[54] COMPOUND BEARING ASSEMBLY AND METHOD OF MANUFACTURING THE SAME

[75] Inventor: Rikuro Obara, Nagano-ken, Japan

[73] Assignee: Minebea Kabushiki-Kaisha, Nagano-ken, Japan

[21] Appl. No.: 09/136,960

[22] Filed: Aug. 20, 1998

Related U.S. Application Data

[62] Division of application No. 08/675,495, Jul. 3, 1996, Pat. No. 5,800,069.

[30] Foreign Application Priority Data

Jul. 7, 1995 [JP] Japan .................................. 7-186139
Jul. 7, 1995 [JP] Japan .................................. 7-196140

[51] Int. Cl.[7] .............................. B23P 15/00; F16C 33/00
[52] U.S. Cl. ................... 29/898.062; 384/504; 384/520; 29/898.07; 29/898.09
[58] Field of Search .................................. 384/499, 501, 384/504, 505, 506, 512, 517, 523; 29/898.07, 898.09, 898.062

[56] References Cited

U.S. PATENT DOCUMENTS

| | | | |
|---|---|---|---|
| 2,668,925 | 2/1954 | Bloser | 29/898.07 |
| 2,825,200 | 3/1958 | Boullion | 57/77.45 |
| 5,341,569 | 8/1994 | Takamizawa et al. | 29/898.09 |
| 5,509,198 | 4/1996 | Takamizawa et al. | 29/898.09 |
| 5,556,209 | 9/1996 | Obara et al. | 384/504 |
| 5,655,846 | 8/1997 | Obara | 29/898.09 |
| 5,808,388 | 9/1998 | Obara | 29/898.07 |

FOREIGN PATENT DOCUMENTS

| | | | |
|---|---|---|---|
| 0337054 | 4/1959 | Switzerland | 29/898.07 |
| 0338163 | 6/1959 | Switzerland | 29/898.07 |

*Primary Examiner*—S. Thomas Hughes
*Assistant Examiner*—Marc W. Butler
*Attorney, Agent, or Firm*—Lowe Hauptman Gopstein Gilman & Berner

[57] ABSTRACT

A single-piece outer race ring 3, a sleeve-like spacer 11, a plurality of first balls 4, a conventional ball bearing unit 7, a stepped-diameter shaft 1 and the like are assembled into a compound bearing assembly by a bearing maker with high accuracy to enable a user to be free from a cumbersome assembling work of rotating portions or cylindrical rotary shaft and its bearing means of a computer and its peripheral devices. In use, the compound bearing assembly is coaxially mounted in the cylindrical rotary shaft and the like at the user's end to rotatably support the cylindrical rotary shaft and the like in the computer and its peripheral devices.

2 Claims, 2 Drawing Sheets

COMPOUND BEARING ASSEMBLY AND METHOD OF MANUFACTURING THE SAME

This application is a Divisional of application Ser. No. 08/675,495 filed Jun. 3, 1996 now U.S. Pat. No. 5,800,069.

BACKGROUND OF THE INVENTION

1. Field of the Invention

The present invention relates to a compound bearing assembly and a method of manufacturing the same, the compound bearing assembly being used in rotating portions of a computer and its peripheral devices.

2. Description of the Prior Art

As for a conventional compound bearing assembly constructed of a pair of ball bearing units A, B mounted on a rotary shaft D of rotating portions of a computer or its peripheral devices, as is clear from FIG. 4(a), it is necessary to produce its components separately. Consequently, a sleeve-like spacer C and such pair of the ball bearing units A, B are produced separately from each other. These components A, B, C of the conventional compound bearing assembly are then delivered to a user. After receipt of the components, the user mounts the components A, B, C on the rotary shaft D to complete the conventional compound bearing assembly, as shown in FIG. 4(b).

As described above, in the conventional compound bearing assembly, it is necessary for the user to mount the pair of the ball bearing units A, B and the spacer C on the rotary shaft D in a condition in which the ball bearing units A, B are spaced apart from each other through the spacer C. Consequently, the conventional compound bearing assembly suffers from the following problems:

(a) While keeping a sufficient rigidity, the rotary shaft D is required to be sized in outer diameter so as to engage with the inner race rings of the ball bearing units A, B;

(b) Since the spacer C is a separate component independent of the pair of the ball bearing units A and B, it is necessary for the spacer C to have its opposite end surfaces improved in parallelism therebetween and also in flatness thereof, taken in connection with the dimensions of the ball bearing units A, B being assembled together with the spacer C; and (c) Since the spacer C is merely sandwiched between a pair of outer race rings of the ball bearing units A and B, it is necessary for the user to have the spacer C coaxially mounted on the rotary shaft D with high accuracy, which requires the spacer C to have its opposite axial end surfaces brought into uniform contact with axially inner end surfaces of the outer race rings of the ball bearing units A, B, and, therefore takes much time and labor.

SUMMARY OF THE INVENTION

It is an object of the present invention to solve the above problems by providing a compound bearing assembly and a method of manufacturing the same, the compound bearing assembly being easily mounted in rotating portions of a computer and its peripheral devices at the user's end.

According to a first aspect of the present invention, the above object of the present invention is accomplished by providing:

A compound bearing assembly characterized in that:

(a) a stepped-diameter shaft is provided with a large-diameter portion, a small-diameter portion and an inner raceway groove directly formed in an outer peripheral surface of the large-diameter portion of the shaft;

(b) the stepped-diameter shaft is encircled by a sleeve-like outer race ring which is provided with a single-piece outer race ring in one of its axially opposite ends and an outer raceway groove in an inner peripheral surface of the other of the axially opposite ends; and (c) a plurality of first balls rotatably mounted in the inner raceway groove of the large-diameter portion of the shaft are held by the outer raceway groove of the single-piece outer race ring, and a plurality of second balls rotatably mounted in the inner raceway groove of the inner race ring are held by the outer raceway groove of the sleeve-like outer race ring or by that of the single-piece outer race ring.

According to a second aspect of the present invention, the above object of the present invention is accomplished by providing:

the compound bearing assembly as set forth in the first aspect of the present invention, wherein:

the first balls around the inner raceway groove of the large-diameter portion are held by the outer raceway groove of the single-piece outer race ring; and the second balls around the inner raceway groove of the inner race ring mounted on the small-diameter portion are held by the outer raceway groove of the sleeve-like outer race ring.

According to a third aspect of the present invention, the above object of the present invention is accomplished by providing:

the compound bearing assembly as set forth in the first aspect of the present invention, wherein:

the first balls around the inner raceway groove of the large-diameter portion of the shaft are held by the outer raceway groove of the sleeve-like outer race ring; and the second balls around the inner raceway groove of the inner race ring mounted on the small-diameter portion are held by the outer raceway groove formed in an inner peripheral surface of the outer race ring.

According to a fourth aspect of the present invention, the above object of the present invention is accomplished by providing:

A method of manufacturing a compound bearing assembly characterized in that:

a stepped-diameter shaft is provided with a large-diameter portion, a small-diameter portion and an inner raceway groove directly formed in an outer peripheral surface of the large-diameter portion of the stepped-diameter shaft;

the stepped-diameter shaft is encircled by a sleeve-like outer race ring which is provided with a single-piece outer race ring in one of its axially opposite ends and an outer raceway groove in an inner peripheral surface of the other of the axially opposite ends;

a plurality of first balls rotatably mounted in the inner raceway groove of the large-diameter portion of the shaft are held by the outer raceway groove of the single-piece outer race ring, and a plurality of second balls rotatably mounted in the inner raceway groove of the inner race ring are held by the outer raceway groove of the sleeve-like outer race ring or by that of the outer race ring;

in a condition in which a predetermined pre-load is applied to an outer end portion of the inner race ring or of the sleeve-like outer race ring, the inner race ring is firmly bonded to the small-diameter portion of the stepped-diameter shaft by means of an adhesive;

whereby the components such as the sleeve-like outer race ring, single-piece outer race ring, inner race ring and the like are assembled together with the stepped-diameter shaft into a compound bearing assembly.

According to a fifth aspect of the present invention, the above object of the present invention is accomplished by providing:

the method of manufacturing the compound bearing assembly, as set forth in the fourth aspect of the present invention, wherein:

the first balls around the inner raceway groove of the large-diameter portion of the shaft are held by the outer raceway groove of the single-piece outer race ring; and the second balls around the inner raceway groove of the single-piece outer race ring are held by an outer raceway groove of the sleeve-like outer race ring, the outer raceway groove being formed in an inner peripheral surface of the sleeve-like outer race ring.

According to a sixth aspect of the present invention, the above object of the present invention is accomplished by providing:

the method of manufacturing the compound bearing assembly, as set forth in the fourth aspect of the present invention, wherein:

the first balls around the inner raceway groove of the large-diameter portion of the shaft are held by the outer raceway groove of the sleeve-like outer race ring; and the second balls around the inner raceway groove of the inner race ring mounted on the small-diameter portion of the shaft are held by an outer raceway groove of the outer race ring, the outer raceway groove being formed in an inner peripheral surface of the outer race ring.

According to a seventh aspect of the present invention, the above object of the present invention is accomplished by providing:

a compound bearing assembly characterized in that:

an inner raceway groove is directly formed in an outer peripheral surface of a large-diameter portion of a stepped-diameter shaft which is provided with a small-diameter portion together with the large-diameter portion;

first balls disposed between the inner raceway groove and an outer raceway groove which is formed in an inner peripheral surface of a single-piece outer ring mounted around the large-diameter portion;

a ball bearing unit has its inner race ring mounted on the small-diameter portion of the stepped-diameter shaft and its balls disposed between its inner and its outer race ring; and a sleeve-like spacer is axially sandwiched between the outer race ring of the ball bearing unit and the single-piece outer ring.

According to a eighth aspect of the present invention, the above object of the present invention is accomplished by providing:

a method of manufacturing a compound bearing assembly is characterized in that:

an inner raceway groove is directly formed in an outer peripheral surface of a large-diameter portion of a stepped-diameter shaft which is provided with a small-diameter portion together with the large-diameter portion;

first balls disposed between the inner raceway groove and an outer raceway groove which is formed in an inner peripheral surface of a single-piece outer ring mounted around the large-diameter portion;

a ball bearing unit has its inner race ring slidably mounted on the small-diameter portion of the stepped-diameter shaft and its balls disposed between its inner and its outer race ring;

a sleeve-like spacer is axially sandwiched between the outer race ring of the ball bearing unit and the single-piece outer ring; and the inner race ring of the ball bearing unit is fixed to the small-diameter portion of the stepped-diameter shaft in a condition in which a predetermined pre-load is applied to an outer end surface of one of the inner and the outer race ring of the ball bearing unit.

BRIEF DESCRIPTION OF THE DRAWINGS

FIG. 4(*b*) is a longitudinal sectional view of the conventional compound bearing assembly after completion of assembling work thereof, illustrating both the ball bearing units and the spacer having been properly mounted on a shaft.

DESCRIPTION OF THE PREFERRED EMBODIMENTS

Hereinbelow, the present invention will be described in detail with reference to the accompanying drawings.

Figure 1:
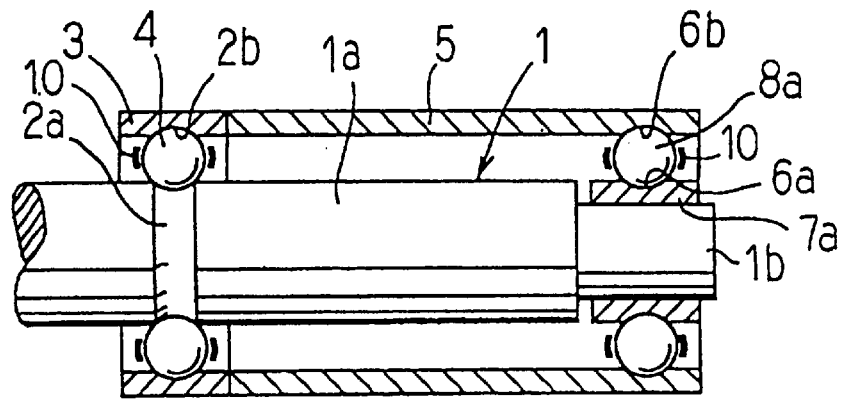
FIG. 1 is a longitudinal sectional view of a first embodiment of the compound bearing assembly of the present invention.

FIG. 1 shows a first embodiment of a compound bearing assembly of the present invention.

As shown in FIG. 1, a a stepped-diameter shaft 1 is provided with a large-diameter portion 1*a* and a small-diameter portion 1*b*. Directly formed in an outer peripheral surface of the large-diameter portion 1*a* of the shaft 1 is an annular inner raceway groove 2*a*.

A single-piece outer race ring 3 is oppositely disposed from the inner raceway groove 2*a* of the large-diameter portion 1*a* of the shaft 1, and provided with an annular outer raceway groove 2*b* in its inner peripheral surface, so that a plurality of first balls 4 are rotatably mounted between the inner raceway groove 2*a* of the shaft 1 and the outer raceway groove 2*b* of the outer race ring 3.

As is clear from FIG. 1, a sleeve-like outer race ring 5 is provided with an annular outer raceway groove 6*b* in an inner peripheral surface of its outer-end portion (i.e., its right-hand portion as viewed in FIG. 1). This outer raceway groove 6*b* of the outer race ring 5 is oppositely disposed from an inner race ring 7*a*. This inner race ring 7*a* is mounted on the small-diameter portion 1*b* of the stepped-diameter shaft 1 in an insertion manner, and provided with an annular inner raceway groove 6*a* in its outer peripheral surface. A plurality of second balls 8*a* are rotatably mounted between the the outer raceway groove 6b of the sleeve-like outer race ring 5 and the inner raceway groove 6a of the inner race ring 7a.

Further, an outer diameter of the inner race ring 7a mounted on the small-diameter portion 1b of the stepped-diameter shaft 1 is equal to an outer diameter of the large-diameter portion 1a of the shaft 1. Consequently, the first balls 4 and the second balls 8a are the same in diameter.

In this first embodiment of the compound bearing assembly of the present invention, in its assembling work, for example, the inner race ring 7a is first slidably mounted on the small-diameter portion 1b of the shaft 1 in an insertion manner. Then, a predetermined pre-load is axially inwardly applied to an outer-end surface (i.e., a right-hand end surface as viewed in FIG. 1) of the inner race ring 7a. Under such circumstances, the inner race ring 7a is bonded to the small-diameter portion 1b of the shaft 1 by means of a suitable adhesive or similar connecting means. Thus the outer race ring 3, sleeve-like outer race ring 5, inner race ring 7a and the remaining components are assembled on the stepped-diameter shaft 1 to form the first embodiment of the compound bearing assembly of the present invention.

Incidentally, in FIG. 1: the reference numeral 10 denotes a ball retainer coaxially arranged with the stepped-diameter shaft 1 so as to be mounted around the shaft 1.

Figure 2:
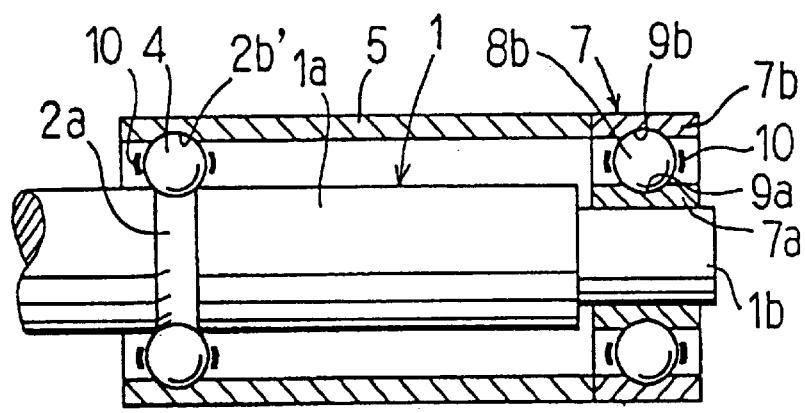
FIG. 2 is a longitudinal sectional view of a second embodiment of the compound bearing assembly of the present invention.

FIG. 2 shows a second embodiment of the compound bearing assembly of the present invention.

In this second embodiment, the inner raceway groove 2a is directly formed in an outer peripheral surface of the large-diameter portion 1a of the stepped-diameter shaft 1.

As is clear from FIG. 2, in the second embodiment of the present invention, the sleeve-like outer race ring 5 is provided with an annular outer raceway groove 2b' in an inner peripheral surface of its outer-end portion (i.e., its left-hand portion as viewed in FIG. 2). This outer raceway groove 2b' of the outer race ring 5 is oppositely disposed from an inner raceway groove 2a directly formed in an outer peripheral surface of the large-diameter portion 1a of the stepped-diameter shaft 1. A plurality of the first balls 4 are rotatably mounted between the outer raceway groove 2b' of the sleeve-like outer race ring 5 and the inner raceway groove 2a of the large-diameter portion 1a of the shaft 1.

A ball bearing unit 7 is a conventional one comprising an outer race ring 7b, the inner race ring 7a, a plurality of third balls 8b rotatably mounted between these race rings 7b, 7a, a ball retainer 10 and the inner race ring 7a, and has its inner race ring 7a fixedly mounted on the small-diameter portion 1b of the stepped-diameter shaft 1 in an insertion manner.

Further, as is clear from FIG. 2, an outer diameter of the inner race ring 7a of the ball bearing unit 7 is the same as that of the large-diameter portion 1a of the shaft 1, while an outer and an inner diameter of the outer race ring 7b of the ball bearing unit 7 are the same as those of the sleeve-like outer race ring 5. Consequently, the balls 4, 8b are the same in diameter.

In this second embodiment of the present invention shown in FIG. 2, in its assembling work, for example, the inner race ring 7a is first slidably mounted on the small-diameter portion 1b of the shaft 1 in an insertion manner. Then, a predetermined pre-load is axially inwardly applied to an outer-end surface (i.e., a right-hand end surface as viewed in FIG. 2) of the inner race ring 7a. Under such circumstances, the inner race ring 7a is bonded to the small-diameter portion 1b of the shaft 1 by means of a suitable adhesive of like connecting means. Thus the sleeve-like outer race ring 5, outer race ring 7b, inner race ring 7a and the remaining components are assembled on the stepped-diameter shaft 1 to form the second embodiment of the compound bearing assembly of the present invention.

Figure 3:
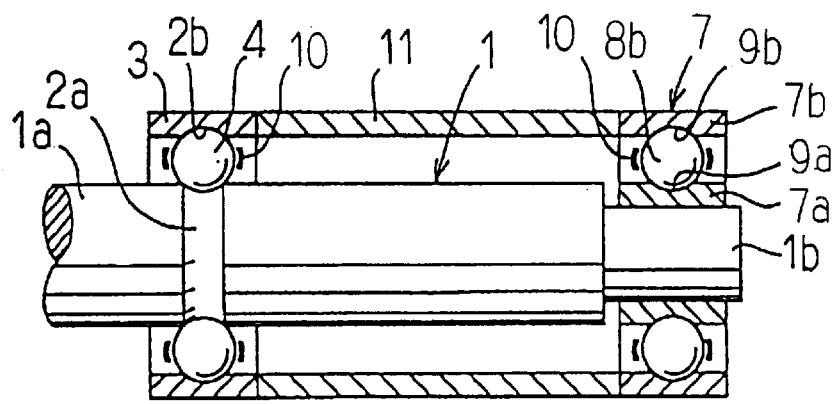
FIG. 3 is a longitudinal sectional view of a third embodiment of the compound bearing assembly of the present invention.
Figure 4A:
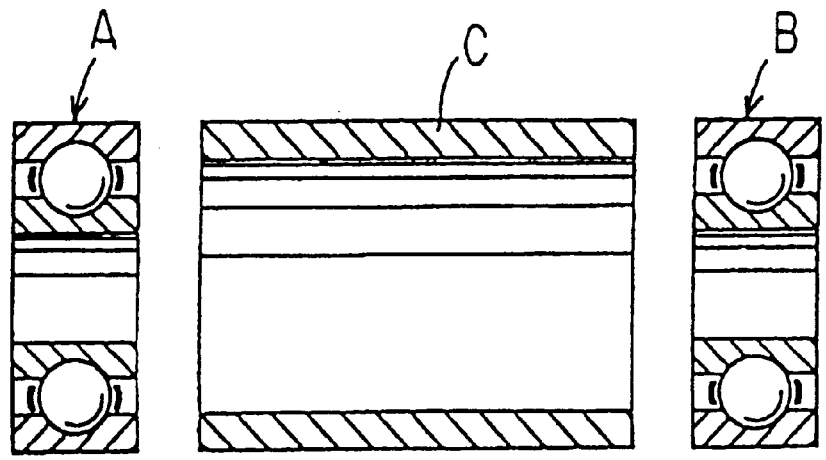
FIG. 4(*a*) is a longitudinal sectional view of a conventional compound bearing assembly, illustrating each of its components, i.e., a pair of ball bearing units and a spacer, from which the compound bearing assembly is assembled.
Figure 4B:
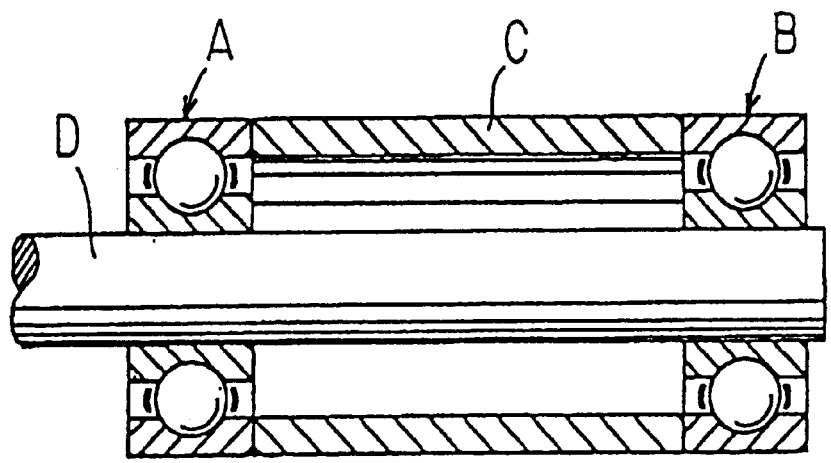

FIG. 3 shows a third embodiment of the compound bearing assembly of the present invention.

This third embodiment of the compound bearing assembly is assembled on the stepped-diameter shaft 1 which is provided with the annular inner raceway groove 2a in its outer peripheral surface. In the third embodiment, the single-piece outer race ring 3 is provided with the annular outer raceway groove 2b in its inner peripheral surface, and coaxially mounted around the large-diameter portion 1a of the stepped-diameter shaft 1 while spaced apart from the large-diameter portion 1a to define an annular space therebetween. Rotatably mounted in this annular space are a plurality of the first balls 4.

On the other hand, the conventional ball bearing unit 7, which comprises the outer race ring 7b, inner race ring 7a, a plurality of third balls 8b rotatably mounted between these race rings 7b and 7a and the ball retainer 10, has its inner race ring 7a mounted on the small-diameter portion 1b of the shaft 1. A sleeve-like spacer 11 is fixedly sandwiched between the single-piece outer race ring 3 and an outer race ring 7b of the ball bearing unit 7 so as to be coaxially arranged with the shaft 1.

An outer diameter of the inner race ring 7a of the ball bearing unit 7 is equal to that of the large-diameter portion 1a of the stepped-diameter shaft 1. Further, an outer and an inner diameter of the outer race ring 7b of the ball bearing unit 7 are equal to those of the single-piece outer race ring 3, respectively. Consequently, the first balls 4 and the second balls 6 are the same in diameter.

Also in this third embodiment of the present invention as is in the second embodiment of the present invention, the inner race ring 7a of the ball bearing unit 7 is axially slidably mounted on the small-diameter portion 1b of the stepped-diameter shaft 1 in an insertion manner. Then, a predetermined pre-load is axially inwardly applied to the outer-end surface (i.e., the right-hand end surface as viewed in FIG. 3) of the inner race ring 7a of the ball bearing unit 7. Under such circumstances, the inner race ring 7a is firmly bonded to the small-diameter portion 1b of the shaft 1. Thus the components of the compound bearing assembly of the present invention such as the outer race ring 3, sleeve-like spacer 11, inner race ring 7a and the like are assembled on the stepped-diameter shaft 1 to complete the third embodiment of the compound bearing assembly of the present invention.

Incidentally, in the drawings: the reference numerals 9a and 9b denote an inner raceway groove and an outer raceway groove, respectively.

Although the balls 4, 8a, 8b are the same in diameter in any one of the above embodiments of the compound bearing assembly of the present invention, it is also possible to use the first balls 4, which are different in diameter from the other balls 8a and 8b, in the large-diameter portion 1b of the stepped-diameter shaft 1.

The compound bearing assembly of the present invention having the above construction has the following actions and effects:

(1) Since the components such as the single-piece outer race ring 3, balls 4, sleeve-like spacer 5, ball bearing unit 7 and the like are already assembled on the stepped-diameter shaft 1 by a bearing maker to form the compound bearing assembly of the present invention, the user is released from a cumbersome assembling work of the compound bearing assembly, so that the compound bearing assembly of the present invention is easily mounted inside a sleeve-like rotating element of a desired instrument by inserting the assembly into the rotating element and fixing the assembly therein;

(2) Since the compound bearing assembly of the present invention uses the stepped-diameter shaft 1 provided with the large-diameter portion 1a having its outer peripheral surface formed into the annular inner raceway groove 2a, it is possible for the compound bearing assembly of the present invention to eliminate the conventional type inner race ring in the large-diameter portion 1a of the stepped-diameter shaft 1, which permits the shaft 1 to be partially improved in rigidity;

(3) Since the stepped-diameter shaft 1 is provided with the large-diameter portion 1a, and, therefore improved in rigidity, it is possible to increase the resonance point of a spindle motor which is provided with the compound bearing assembly of the present invention and used in office automation instruments and similar systems, so that the spindle motor provided with the compound bearing assembly of the present invention may be prevented from resonating to the remaining components of the instruments, whereby these instruments are improved in reliability;

(4) The number of conventional ball bearing units used in the compound bearing assembly of the present invention is only, particularly the ball bearing unit 7. Consequently, the compound bearing assembly of the present invention uses only one inner race ring 7a, and has a number of components in comparison with the conventional compound bearing assemblies; and (5) The sleeve-like outer race ring 5 and the spacer 11 may be fabricated by the bearing maker so as to align with the ball bearing unit 7 and the single-piece outer race ring 3 with high accuracy.

In each of the first and the second embodiments of the compound bearing assembly of the present invention, a sleeve-like outer race ring 5 serves as both a conventional outer race ring and a sleeve-like spacer. Consequently, the following actions and effects are further obtained:

(6-1) Since the sleeve-like outer race ring 5 also serves as a spacer, it is possible to eliminate a conventional independent spacer, which makes it possible for the compound bearing assembly of the present invention to reduce the number of its components;

(6-2) In comparison with the conventional compound bearing assembly in which a pair of the ball bearing units A, B are disposed in axially opposite sides of the spacer C, it is possible for the compound bearing assembly of the present invention to reduce its entire axial length, which makes it possible to downsize the instruments provided with the compound bearing assembly of the present invention; and (6-3) In the sleeve-like outer race ring 5, one of its axially opposite end surfaces must be machine-finished so as to be brought into uniform contact with the axially inward end surface of the outer race ring 3 or 7b. However, the other of the axially opposite end surfaces of the sleeve-like outer race ring 5 may remain unmachined, which permits a reduction of the number of process steps in manufacturing the compound bearing assembly of the present invention.

What is claimed is:

1. A method of manufacturing a bearing assembly, comprising the steps of:

forming an annular inner raceway groove (2a) directly in an outer peripheral surface of a large-diameter portion (1a) of a stepped-diameter shaft (1) having said large-diameter portion (1a) and a small-diameter portion (1b);

mounting a plurality of first balls (4) in an annular space defined between said annular inner raceway groove (2a) of said stepped-diameter shaft (1) and an annular outer raceway groove (2b) formed in an inner peripheral surface of a single-piece outer race ring (3), said annular outer raceway groove (2b) being coaxially disposed around said large-diameter portion (1a) of said stepped-diameter shaft (1) so as to be oppositely disposed from said annular inner raceway groove (2a) of said stepped-diameter shaft (1);

coaxially mounting a sleeve-like outer race ring (5) around said stepped-diameter shaft (1) so as to be spaced apart therefrom and to be aligned with said single-piece outer race ring (3), said sleeve-like outer race ring (5) having two axially opposite ends and being provided with an annular outer raceway groove (6b) in an inner peripheral surface at one end of its axially opposite ends; the other end of said axially opposite ends of said sleeve-like outer race ring (5) axially aligned with said single-piece outer race ring (3);

slidably mounting an inner race ring (7a) on said small-diameter portion (1b) of said stepped-shaft (1);

mounting a plurality of second balls (8a) in an annular space defined between an annular inner raceway groove (6a) of said inner race ring (7a) and said annular outer raceway groove (6b) of said sleeve-like outer race ring (5); and bonding said inner race ring (7a) to said small-diameter portion (1b) of said stepped-diameter shaft (1) by connecting means in a condition in which a predetermined axially inward pre-load is applied to an outer end surface of said inner race ring (7a) or said sleeve-like outer race ring (5);

whereby said single-piece outer race ring (3), said sleeve-like outer race ring (5), said plurality of first and second balls (4, 8a), said inner race ring (7a) and said stepped-diameter shaft (1) are assembled into a bearing assembly.

2. A method of manufacturing a bearing assembly, comprising the steps of:

forming an annular inner raceway groove (2a) directly in an outer peripheral surface of a large-diameter portion (1a) of a stepped-diameter shaft (1) having a small-diameter portion (1b) and said large-diameter portion (1a);

mounting a plurality of first balls (4) in an annular space defined between said annular inner raceway groove (2a) of said stepped-diameter shaft (1) and an annular outer raceway groove (2b') formed in an inner peripheral surface at one end of axially opposite ends of a sleeve-like outer race ring (5), said annular outer raceway groove (2b) being coaxially disposed around said stepped-diameter shaft (1) so as to be oppositely disposed from said annular inner raceway groove (2a) of said stepped-diameter shaft (1);

mounting an outer race ring (7b) of a ball bearing unit (7) on the other end of the axially opposite ends of said sleeve-like outer race ring (5) so as to be aligned with said sleeve-like outer race ring (5), said ball bearing unit (7) being provided with a plurality of second balls (8b) and an inner race ring (7a), said ball bearing unit (7) having its inner race ring (7a) slidably mounted on said small-diameter portion (1b) of said stepped-diameter shaft (1); and bonding said inner race ring (7a) to said small-diameter portion (1b) of said stepped-diameter shaft (1) by an adhesive connecting means in a condition in which a predetermined axially inward pre-load is applied to an outer end surface of said inner race ring (7a) or said single-piece outer race ring (7b);

whereby said sleeve-like outer race ring (5), said plurality of first balls (4), said ball bearing unit (7) and said stepped-diameter shaft (1) are assembled into a bearing assembly.

* * * * *